(12) United States Patent
Bourgault et al.

(10) Patent No.: US 6,575,679 B2
(45) Date of Patent: Jun. 10, 2003

(54) SECURE ACCESSORY SYSTEM FOR A TRUCK BOX

(76) Inventors: Gerard Bourgault, Box 39, St. Brieux, Saskatchewan (CA), S0K 3V0; Michael Gauthier, Box 264, St. Brieux, Saskatchewan (CA), S0K 3V0; Neil Eisner, Box 194, St. Brieux, Saskatchewan (CA), S0K 3V0

( * ) Notice: Subject to any disclaimer, the term of this patent is extended or adjusted under 35 U.S.C. 154(b) by 18 days.

(21) Appl. No.: 09/736,750

(22) Filed: Dec. 14, 2000

(65) Prior Publication Data

US 2002/0076293 A1 Jun. 20, 2002

(51) Int. Cl.[7] .................................................. B60P 7/08
(52) U.S. Cl. ............................. 410/90; 410/80; 410/91; 410/94
(58) Field of Search ............................... 410/90, 91, 94, 410/121, 77, 80; 296/39.2, 37.6; 280/759; 224/404

(56) References Cited

U.S. PATENT DOCUMENTS

| | | | | |
|---|---|---|---|---|
| 1,814,304 A | * | 7/1931 | Fitch ............................ | 410/91 |
| 2,030,862 A | * | 2/1936 | Fitch ........................ | 410/91 X |
| 2,954,003 A | * | 9/1960 | Farrell et al. .............. | 410/91 X |
| 3,508,764 A | * | 4/1970 | Dobson et al. ................ | 410/90 |
| 3,762,340 A | * | 10/1973 | Udaloff ......................... | 410/94 |
| 4,222,695 A | * | 9/1980 | Sarides .......................... | 410/68 |
| 4,249,684 A | * | 2/1981 | Miller et al. .............. | 410/90 X |
| 4,805,859 A | * | 2/1989 | Hudson .................... | 410/90 X |
| 4,902,038 A | | 2/1990 | Grover | |
| 4,955,771 A | * | 9/1990 | Bott ............................ | 410/94 |
| 4,971,356 A | | 11/1990 | Cook | |
| 5,330,227 A | | 7/1994 | Anderson | |
| 5,549,428 A | * | 8/1996 | Yeatts .......................... | 410/94 |
| 5,599,055 A | * | 2/1997 | Brown ...................... | 410/90 X |
| 5,609,451 A | * | 3/1997 | McCorkle, Jr. .............. | 410/90 |
| 5,655,863 A | * | 8/1997 | Mundt .......................... | 410/94 |
| 6,012,885 A | * | 1/2000 | Taylor et al. ................. | 410/94 |
| 6,176,657 B1 | * | 1/2001 | Romph ......................... | 410/94 |

* cited by examiner

Primary Examiner—Stephen T. Gordon

(57) ABSTRACT

A system for securing accessories in a truck box comprises right and left anchor beams adapted to be fastened to respective right and left edges of the floor such that inner faces of the anchor beams face each other across an inner floor area. An anchor lip extends from each inner face and an accessory has right and left edges comprising an under lip adapted to fit slidingly under the anchor lip of each anchor member. A lock is operative to lock the accessory in a substantially fixed position along the length of the floor. The accessory can be ballast, a toolbox or other accessory that is secured in a truck box but is easily removed to load cargo.

25 Claims, 4 Drawing Sheets

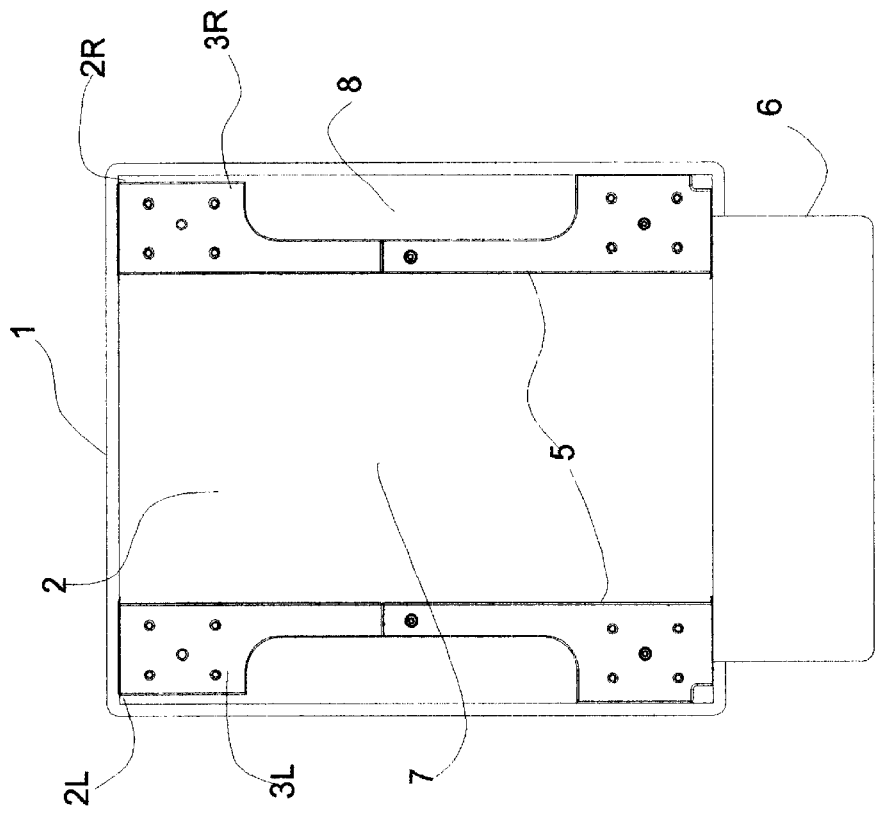
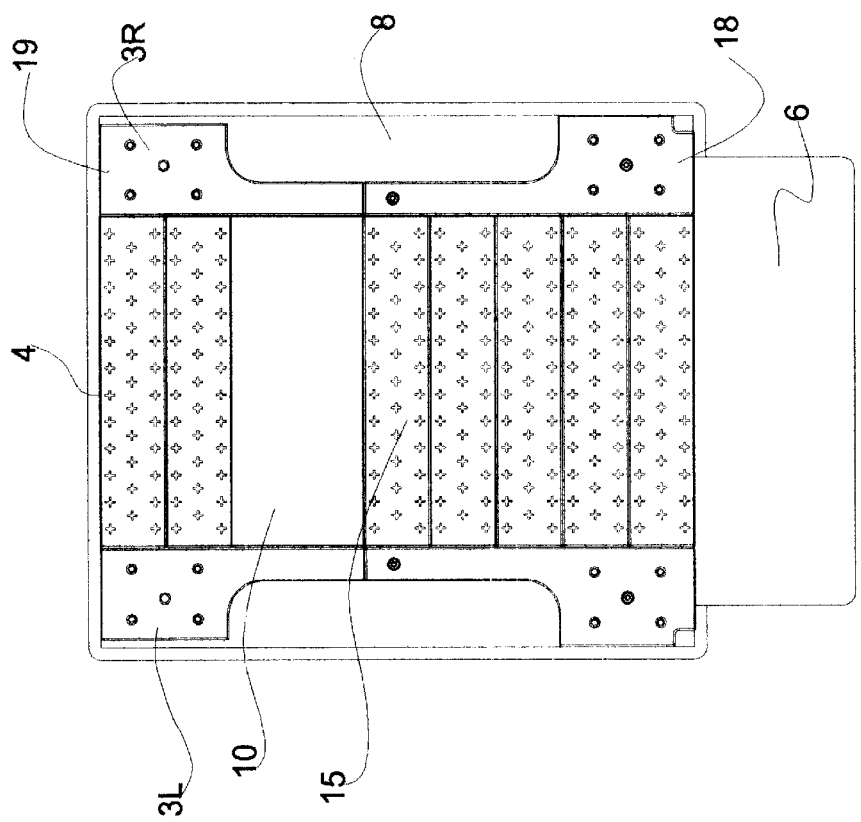

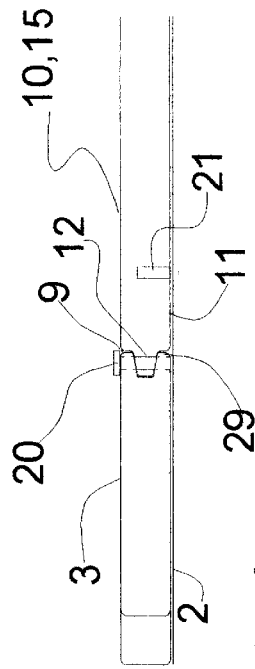
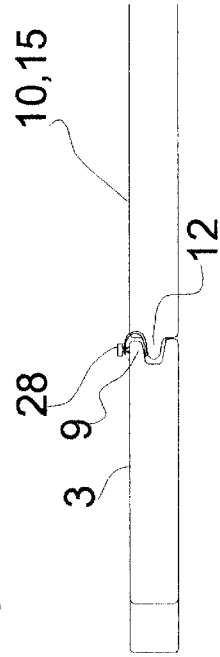
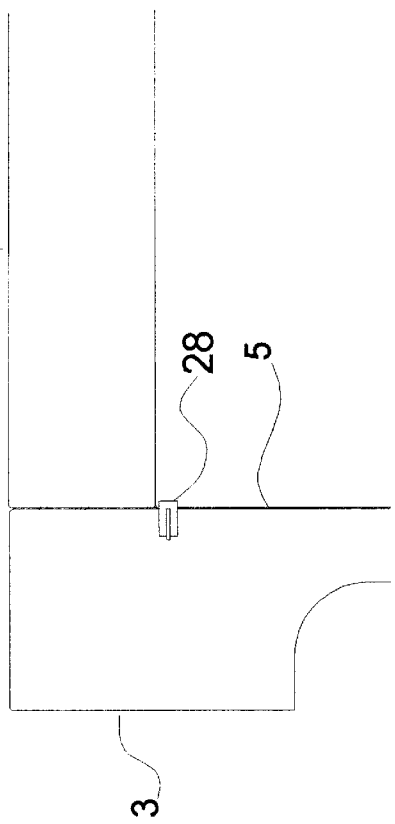
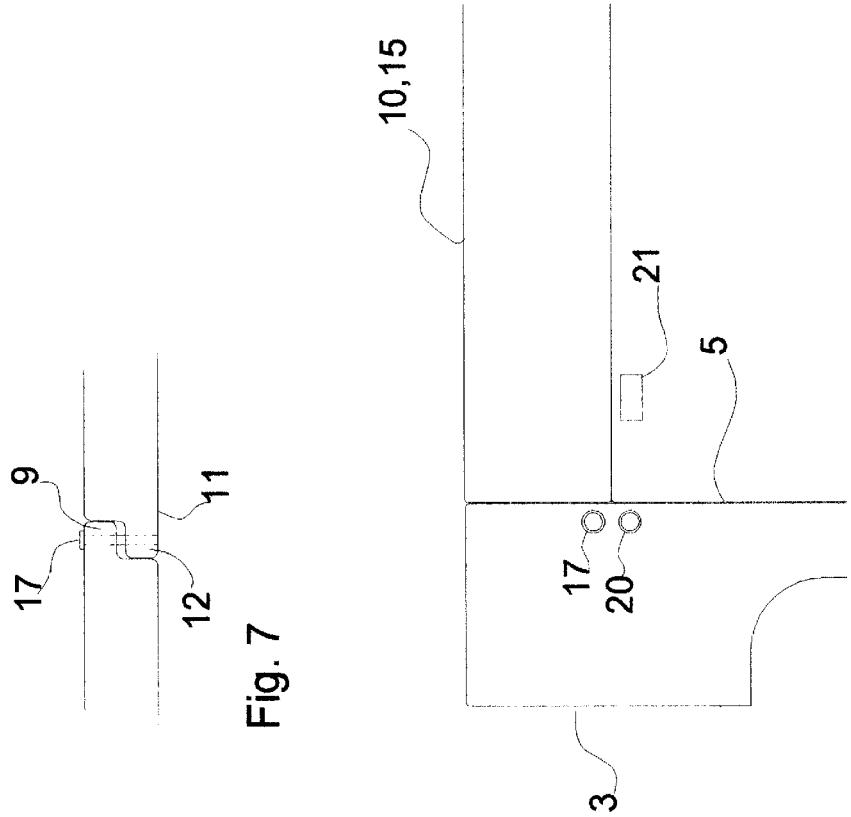

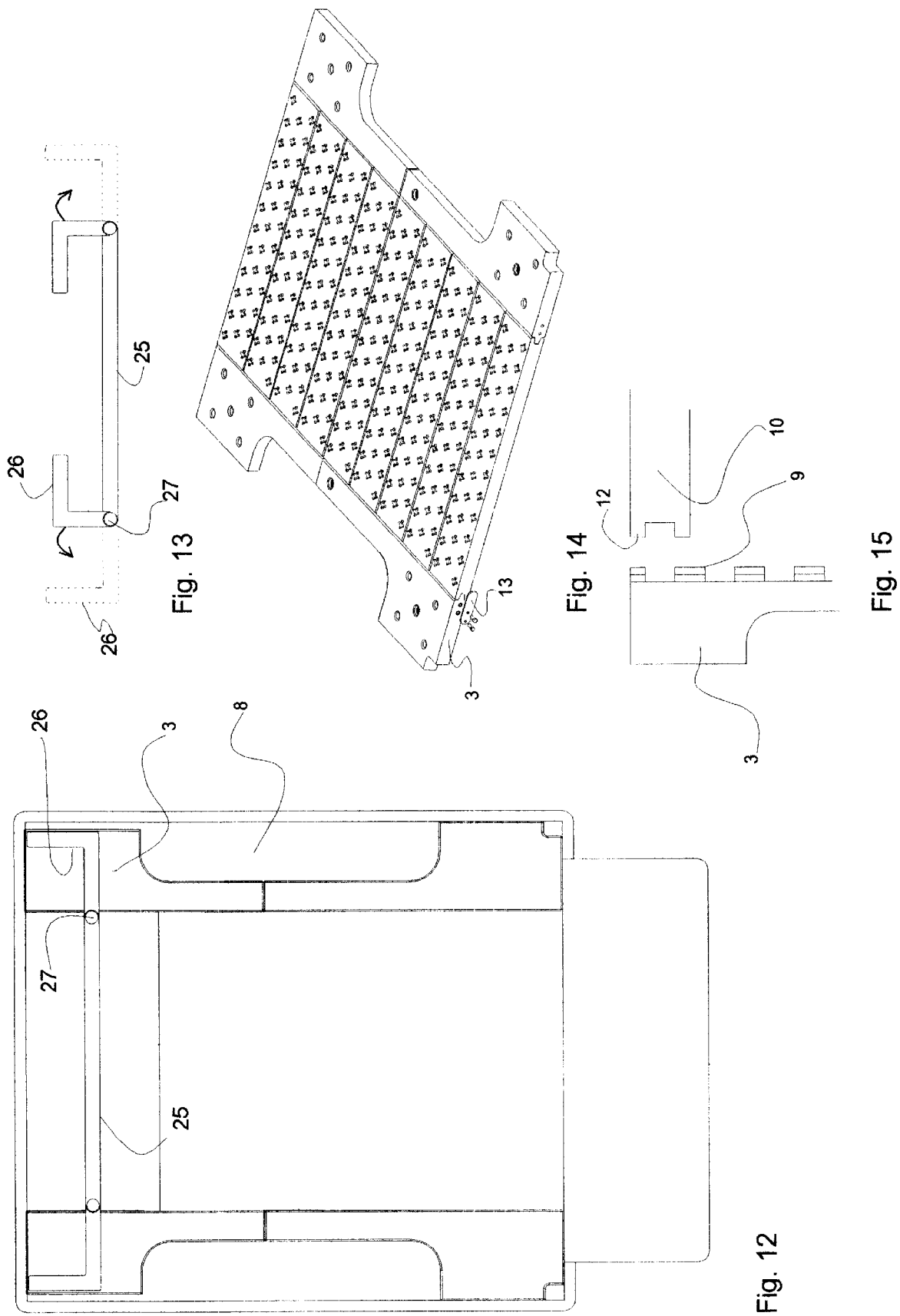

SECURE ACCESSORY SYSTEM FOR A TRUCK BOX

This invention is in the field of trucks and in particular systems for providing securely fastened accessories in a truck box.

BACKGROUND

It is common to carry accessories such as toolboxes and other containers, weights for ballast, and the like in truck boxes. These accessories are preferably secured in the box to prevent shifting during travel, and remain in the truck box for extended periods of time in a semi-permanent fashion. Shifting can damage the article, other contents in the box, or the truck box itself.

Similarly a wide array of cargo is temporarily carried in truck boxes, from groceries to snowmobiles to machine parts. The more permanent accessories such as ballast, toolboxes, and the like often interfere with loading the cargo. These accessories generally are not readily removable once installed in a secure fashion.

Several prior art patents have been directed to the problem of providing a ballast system for truck boxes that does not shift during travel, and provides minimal interference with loading cargo. See for instance U.S. Pat. No. 4,902,038 to Grover, U.S. Pat. No. 4,971,356 to Cook, and U.S. Pat. No. 5,330,227 to Anderson.

These ballast systems provide a relatively thin layer of weights or ballast elements over substantially the whole floor of the truck box, leaving a relatively unhindered load surface. The volume capacity of the truck box is thus only minimally affected. Where heavy cargo is carried on occasion, the ballast may have to be removed in order to stay within the weight capacity of the truck. This removal and subsequent replacement is generally problematic with prior art systems.

These systems as well do not provide for secure attachment of other common accessories such as toolboxes.

SUMMARY OF THE INVENTION

It is an object of the present invention to provide a secure accessory system for truck boxes such that ballast, toolboxes and like accessories are prevented from shifting, and yet can readily be removed if required.

It is a further object of the present invention to provide such a system that provides ballast for the truck with minimal interference to the volume capacity of the box.

It is a further object of the present invention to provide such a system that can provide dividers in the box to limit shifting of cargo to short distances, thereby reducing possible damage.

The present invention provides in one aspect a system for securing accessories in a truck box having a floor. The system comprises right and left anchor beams adapted to be fastened to respective right and left edges of the floor such that inner faces of the anchor beams face each other across an inner floor area. An anchor lip extends from each inner face along a portion of a length of the inner face. An accessory has right and left edges comprising an under lip adapted to fit slidingly under the anchor lip of a corresponding anchor member. At least one lock is operative to lock the accessory in a substantially fixed position along the length of the floor.

The invention provides in a second aspect a system for securing accessories in a truck box having a floor. The system comprises right and left anchor beams fastened to respective right and left edges of the floor such that inner faces of the anchor beams face each other across an inner floor area. An accessory has right and left edges. Means are provided to engage each anchor beam with a corresponding edge of the accessory such that the edges can slide between the anchor beams but are prevented from moving vertically or laterally right or left. Means are provided to lock the accessory into a desired fore and aft location along a length of the anchor beams.

The lock could comprise a series of lock elements anchored in like manner to the accessories. These could be placed in front of and behind the accessory to position the accessory in the proper fore and aft position in the truck box and fill the inner floor surface such that when the tail-gate of the box is raised, the lock members are maintained in position. Alternately pins, screws, clamps or the like could act as locks.

The accessories could be flat ballast accessories providing a level cargo carrying surface on their top faces. Such ballast accessories could act as lock members. Properly configured toolboxes or other containers could be similarly anchored. A fence could be provided across the width or length of the box to divide same into smaller areas to limit shifting of cargo. Almost any accessory that could be useful if secured in a truck box could be conveniently anchored.

Accessories anchored by the system could be quickly removed by removing the lock and sliding the accessories out the rear of the box. Where the anchor and under lips were intermittent, rather than continuous, the accessory could be installed at a mid-point of the anchor beams and moved forward or rearward to engage the anchor beams.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a top view of a an embodiment of the invention;

FIG. 2 is a top view of the anchor beams of FIG. 1 installed in a truck box with the floor between them bare;

FIG. 7 is a schematic rear view of alternate anchor and under lips and pin lock;

FIG. 8 is a schematic top view of alternate positions for pin locks;

FIG. 9 is a schematic rear view of a further alternate anchor and under lips and pin lock;

FIG. 10 is a schematic rear view of the anchor and under lips of FIG. 9 with a clamp lock;

FIG. 11 is a schematic top view of the clamp lock of FIG. 10;

FIG. 12 is a top view of a cargo fence accessory installed in a truck box;

FIG. 13 is a schematic top view of the cargo fence of FIG. 12 showing how same folds for installation.

FIG. 14 is perspective view illustrating an alternate lock;

FIG. 15 is a top view of an embodiment wherein the anchor and under lips are intermittent, allowing the accessory to be engaged at a mid-point of the anchor beam.

DETAILED DESCRIPTION OF THE ILLUSTRATED EMBODIMENTS

Figure 3:
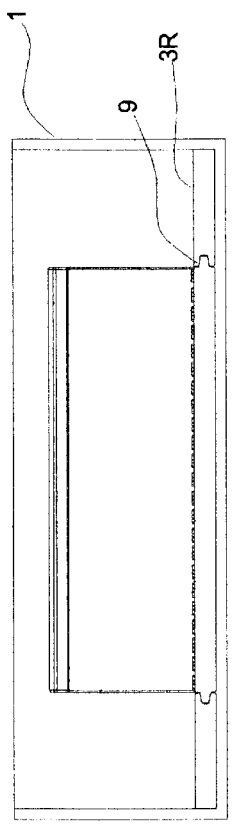
FIG. 3 is a rear view of the embodiment of FIG. 1.

The figures illustrate a system for securing accessories in a truck box 1 having a floor 2 with right and left edges 2R, 2L, and a front wall 4 and conventional tail-gate 6. The system comprises right and left anchor beams 3R, 3L fastened by bolts or the like to respective right and left edges 2R, 2L of the floor 2 such that inner faces 5 of the anchor beams 3 face each other across an inner floor area 7. In the illustrated embodiments, the anchor beams 3 extend along the length of the floor 2, however it may be desirable to have them extend only part way along the floor. The anchor beams 3 are formed to fit around the wheel wells 8 and are made in two pieces for convenience of shipping. An anchor lip 9 extends from each inner face 5 along a portion of the length of the inner face 5. Again as illustrated the anchor lip 9 extends along the full length of the inner face 5, but it may also be intermittent as illustrated in FIG. 15.

An accessory 10 has right and left edges 11R, 11L at a bottom thereof comprising an under lip 12 adapted to fit slidingly under the anchor lip 9 of each anchor member 3. The accessory 10 is locked into the desired fore and aft position along the length of the floor 2. In the embodiment illustrated in FIGS. 1 and 5, the lock comprises a plurality of lock members 15, each lock member 15 having right and left edges 11R, 11L comprising an under lip 12 adapted to fit slidingly under the anchor lip 9 of each anchor member 3.

As illustrated in FIG. 1, the lock members 15 are placed in front of and behind the accessory 10 such that the inner floor area 7 is substantially covered by the accessory 10 and lock members 15. Thus the lock members 15 are maintained in position between the front wall 4 and tail-gate 6 when it is closed. If no tail-gate is present a simple stop member 13 could be screwed to the anchor beam 3, as illustrated in FIG. 14, to lock the apparatus in position. The upper surface of the lock members 15 corresponds to the upper surface of the anchor beams 3, as illustrated in FIGS. 3 and 5, providing a flat cargo surface.

The lock members 15 are essentially accessories 10 performing the function of filling the inner floor area 7 so that the accessories 10 cannot move and are locked into position when the tail-gate 6 is closed. Conveniently, the lock members 15 can be hollow plastic and filled with ballast, such as sand or other dense media, to form ballast accessories. The anchor beams 3 can be hollow and filled with ballast as well. The whole system can be conveniently manufactured from hollow plastic members.

Alternate locking devices and engagement configurations are illustrated in FIGS. 7–11. The anchor lip 9 is fixed in relation to the floor 2, and the under lip 12 on the accessory or lock member slides under the anchor lip 9. Each inner face 5 is thus engaged with a corresponding edge 11 of the accessory 10 such that the edges 11 can slide between the inner faces 5 from the rear end 18 of the anchor beams 3 to the front end 19 thereof, but are prevented from moving vertically or laterally right or left.

Figure 4:
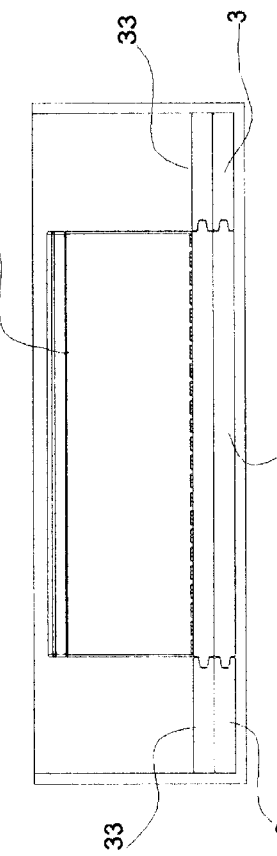
FIG. 4 is a rear view of an alternate embodiment with double anchor beams on each side of the truck box.
Figure 6:
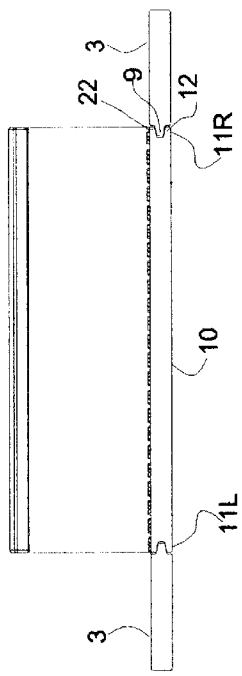
FIG. 6 is a rear view of the components of FIG. 5.
Figure 5:
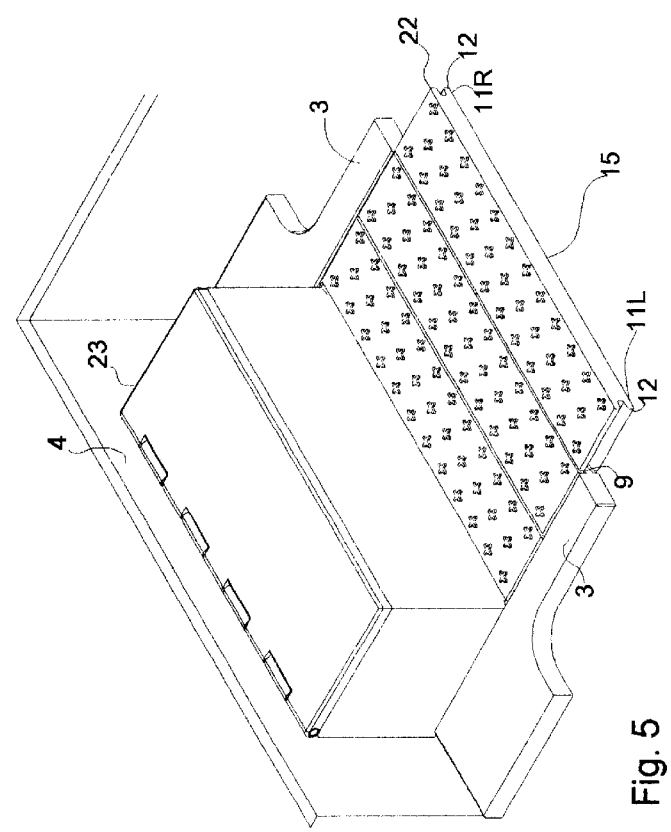
FIG. 5 is a perspective view of components of the embodiment of FIG. 1 as they would be installed in a truck box.

The embodiments illustrated in FIGS. 3, 4, 5, 6, 9, and 10 illustrate a tongue and groove engagement means. In FIGS. 3, 4, 9 and 10, each anchor beam 3 further comprises a second anchor lip 29 extending from each inner face 5 parallel to the aforementioned first anchor lip 9 along substantially the length of the inner face 5 and wherein each under lip 12 fits slidingly between corresponding first and second anchor lips 9, 29. In FIGS. 5 and 6, each under lip 12 has a corresponding parallel over lip 22 such that each anchor lip 9 fits slidingly between corresponding over and under lips 12, 22. In FIGS. 3, 4, 9, and 10 the tongue and groove are simply reversed between the anchor beams 3 and accessories 10 compared to FIGS. 5, 6.

The embodiment of FIG. 7 illustrates a single under lip 12 sliding under a single anchor lip 9. Other engagement configurations will be apparent to those skilled in the art, and all such configurations are contemplated to fall within the scope of the present invention.

In FIG. 7, the lock is provided by a first pin 17 engaging the anchor lip 9 and the under lip 12. In FIG. 9, a second pin 20 engages only the anchor member 3 adjacent to the accessory 10.

Similarly a third pin 21 is inserted in a hole in the floor 2 adjacent to the accessory 10. The location of pins 17, 20 and 21 is shown in FIG. 8. In FIGS. 10 and 11 a clamp 28 is clamped to the anchor lip 9 adjacent to the accessory 10. These various locking devices are preferably installed on both anchor beams 3 on each side of the accessory 10.

In FIGS. 5 and 6, the accessory 10 comprises a container such as a tool box 23. In FIGS. 12 and 13, the accessory 10 comprises an upright fence 25 extending from the right edge 2R to the left edge 2L of the floor 2. To slide past the wheel wells 8, the fence extensions 26 pivot toward the center about a vertical post 27 and then pivot out to the span the floor 2. Tank cradles and other cargo accessories could similarly be provided.

In FIG. 4, right and left upper anchor beams 33 are fastened on top of the aforementioned lower anchor beams 3R, 3L such that the lower anchor beams 3 can serve as anchors for a plurality of ballast elements 10B substantially covering the inner floor surface 7 and providing a flat upper surface. The upper anchor beams 33 can then serve as anchors for a variety of accessories mounted on top of the ballast elements 10B. Alternatively, a double anchor beam could be provided that integrated the upper and lower anchor beams 3, 33.

In FIG. 15, the anchor and under lips 9, 12 are intermittent, allowing the accessory 10 to be engaged at a mid-point of the anchor beam 3, rather than having to slide from the rear end. The anchor lip portion 9 fits between the under lip portions 12 so that the accessory 10 can be moved down into position and then slid forward so that the under lip portions 12 are under the anchor lip portions 9.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

We claim:

1. A system for securing accessories in a truck box having a floor, the system comprising:

right and left anchor beams adapted to be fastened to respective right and left edges of the floor such that inner faces of the anchor beams face each other across an inner floor area;

an anchor lip extending from each inner face along a portion of a length of the inner face;

an accessory having right and left edges comprising an under lip adapted to fit slidingly under the anchor lip of a corresponding anchor member; and at least one lock operative to lock the accessory in a substantially fixed position along the length of the floor.

2. The system of claim 1 wherein the anchor beams extend substantially from a front end to a rear end of the floor.

3. The system of claim 2 wherein the lock comprises at least one lock member having right and left edges comprising an under lip adapted to fit slidingly under the anchor lip of a corresponding anchor member and wherein lock members are placed in front of and behind the accessory such that the inner floor area is substantially covered by the accessory and lock members, and wherein the lock members and accessory can be locked in position between a front wall and a closed tail-gate of the truck box when mounted in the truck.

4. The system of claim 3 wherein an upper surface of each lock member corresponds to an upper surface of the anchor beams.

5. The system of claim 3 wherein each lock member is hollow and filled with ballast to form ballast accessories.

6. The system of claim 1 wherein the anchor beams are hollow and filled with ballast.

7. The system of claim 1 wherein the lock engages the anchor lip and the under lip.

8. The system of claim 1 wherein the lock engages one of the anchor beams adjacent to the accessory.

9. The system of claim 1 wherein the lock engages the floor adjacent to the accessory.

10. The system of claim 1 wherein the lock comprises a pin.

11. The system of claim 8 wherein the lock comprises a clamp.

12. The system of claim 1 wherein each anchor beam further comprises a second anchor lip extending from each inner face parallel to the aforementioned first anchor lip along a corresponding length of the inner face and wherein a portion of each under lip fits slidingly between corresponding first and second anchor lips.

13. The system of claim 1 wherein each under lip has a corresponding parallel over lip and wherein a portion of each anchor lip fits slidingly between corresponding over and under lips.

14. The system of claim 1 wherein the accessory comprises a container.

15. The system of claim 14 where the container is a tool box.

16. The system of claim 1 wherein the accessory comprises an upright fence adapted to extend substantially from the right edge of the floor to the left edge of the floor.

17. The system of claim 1 further comprising right and left upper anchor beams adapted to be fastened on top of the aforementioned lower anchor beams such that the lower anchor beams can serve as anchors for a plurality of ballast elements substantially covering the inner floor surface and providing a flat upper surface, and such that the upper anchor beams can serve as anchors for a variety of accessories mounted on top of the ballast elements.

18. The system of claim 17 wherein corresponding upper and lower anchor beams are integrated into a double anchor beam.

19. A system for securing accessories in a truck box having a floor, the system comprising:

right and left anchor beams fastened to respective right and left edges of the floor such that inner faces of the anchor beams face each other across an inner floor area;

an accessory having right and left edges;

means to engage each anchor beam with a corresponding edge of the accessory such that the edges can slide between the anchor beams but are prevented from moving vertically or laterally right or left; and means to lock the accessory into a desired fore and aft location along a length of the anchor beams.

20. The system of claim 19 wherein the means to engage comprises a tongue and groove.

21. The system of claim 19 wherein the anchor beams extend substantially from a front end to a rear end of the floor.

22. The system of claim 21 wherein the means to lock comprises a plurality of lock members, each lock member having right and left edges comprising an engagement means and wherein the plurality of lock members are placed in front of and behind the accessory such that the inner floor area is substantially covered by the accessory and lock members, and wherein the lock members and accessory are locked in position between a front wall and a closed tailgate of the truck box.

23. The system of claim 22 wherein the lock members are hollow and filled with ballast to form ballast accessories.

24. The system of claim 23 wherein an upper surface of the ballast accessories and anchor beams provides a flat cargo bearing surface.

25. The system of claim 19 wherein the anchor beams include upper and lower engagement means such that a lower layer of ballast accessories can be installed on the floor engaging the lower engagement means, and an accessory can be engaged above the ballast accessories engaging the upper engagement means.

* * * * *